UNITED STATES PATENT OFFICE.

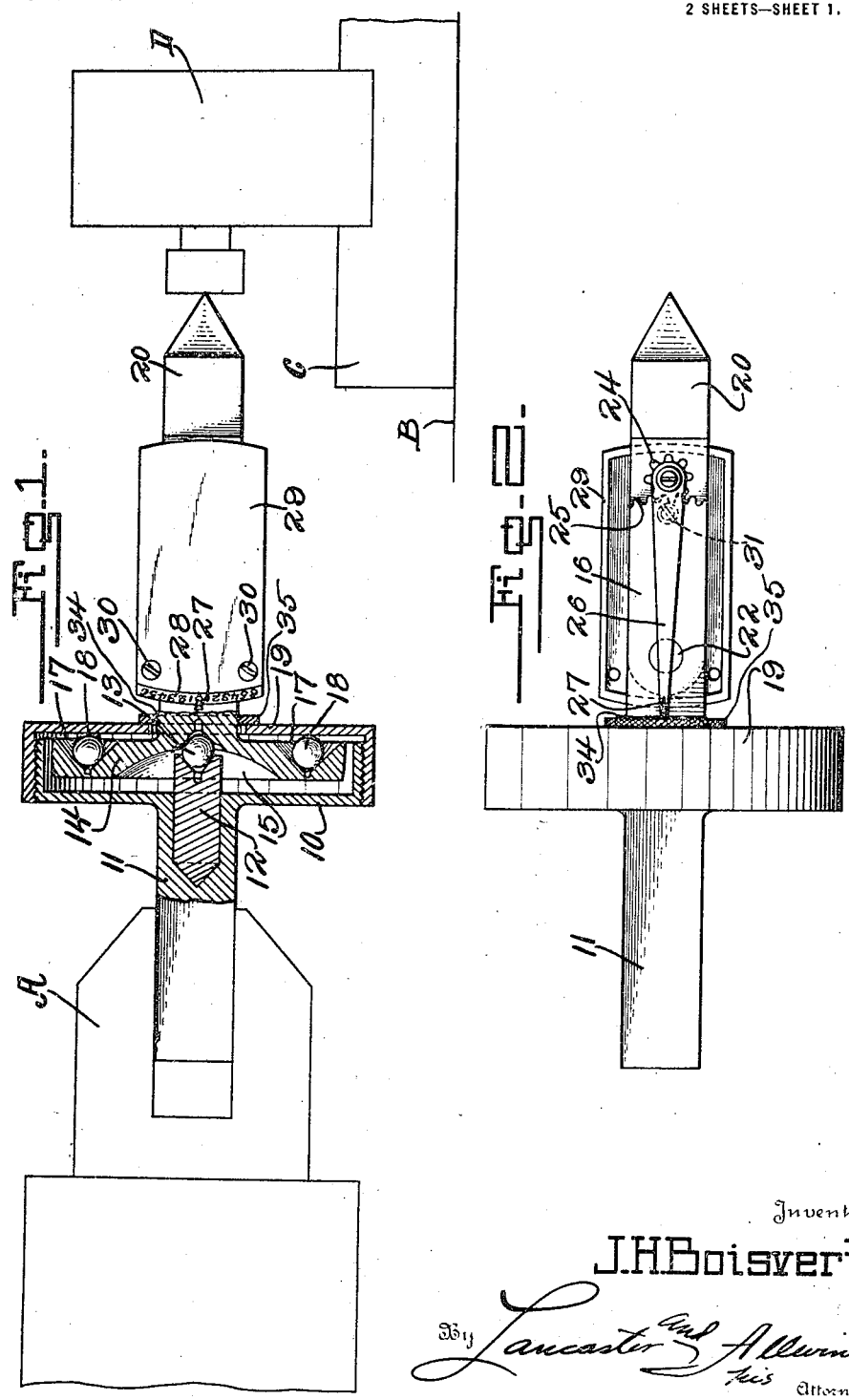

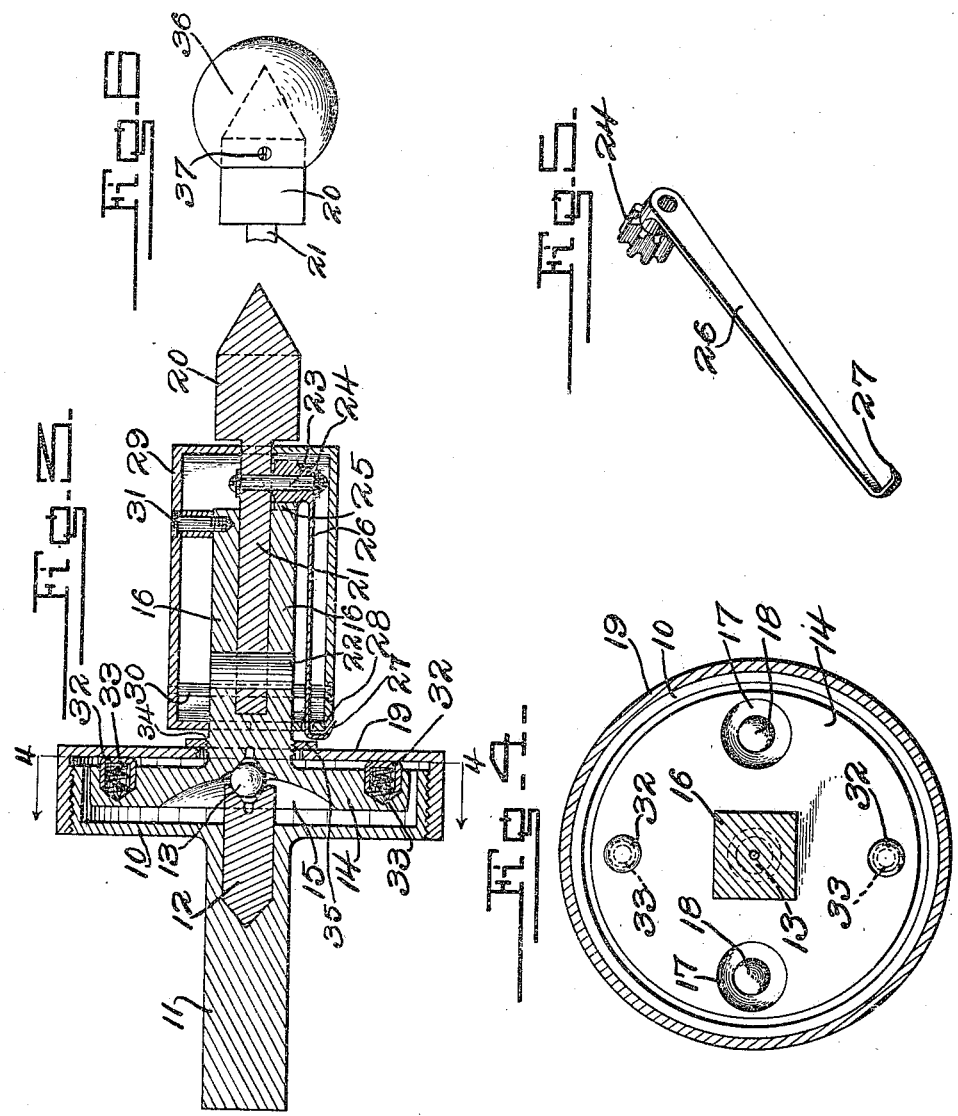

JOSEPH H. BOISVERT, OF WINDSOR, ONTARIO, CANADA.

CENTER-INDICATOR.

1,295,103. Specification of Letters Patent. Patented Feb. 25, 1919.

Application filed July 5, 1917. Serial No. 178,768.

*To all whom it may concern:*

Be it known that I, JOSEPH H. BOISVERT, a subject of the King of Great Britain, and a resident of Windsor, in the Province of Ontario and Dominion of Canada, have invented a certain new and useful Improvement in Center-Indicators, of which the following is a specification.

The present invention relates to indicators, and has for an object to provide an improved indicator for application to milling machines, boring mills, vertical mills, lathes, and the like.

Another object is to provide an indicator of relatively simple construction which may be readily applied to the chuck of the mill or machine, and by means of which the true boring center of the drill or the like may be quickly and accurately ascertained.

Another object of the present invention is to provide an indicator of this character by means of which the vertical and horizontal adjustments of the work may be accurately obtained to center the work at the desired point for boring.

The above, and various other objects and advantages of this invention will be in part described and in part understood, from the following description of the present preferred embodiment, the same being illustrated in the accompanying drawings wherein:

Figure 1 is a side elevation, partly in section, of an indicator constructed according to the present invention and as applied to a milling machine, the latter being shown diagrammatically.

Fig. 2 is a side elevation, partly in section of the indicator.

Fig. 3 is a longitudinal section taken through the indicator at right angles to the showing in Fig. 2.

Fig. 4 is a transverse section through the indicator taken on a plane indicated by the line 4—4 of Fig. 3, and looking in the direction of the arrow.

Fig. 5 is a detail perspective view of the pointer arm and its actuating pinion.

Fig. 6 is a fragmentary view in side elevation of the outer end of the centering pin having a surface contact adjustment applied thereto.

Referring to these drawings, A designates the chuck of a milling machine or the like, B the work table, C the bite for holding the work, and D the stock or work to be operated upon.

The indicator comprises a relatively shallow cylindrical casing 10 provided with an axially extending shank 11 adapted to fit in the chuck A. The inner end of the stem 11, and the integral bottom of the casing 10 are provided with a bore into which is fitted a pin 12, the latter having a concavity or recess in its outer end adapted to receive a ball 13. A swivel disk 14 is fitted in the casing 10 and is provided with a concavity 15 in its inner face in the inner wall of which is formed centrally a recess adapted to receive part of the ball 13 therein. The pin 12 is of sufficient length to project the ball 13 into the concavity 15, and into the seat thereof, and retain the disk 14 in spaced relation from the inner wall of the casing 10.

The disk 14 is provided at its forward side with an axially extending stem 16 which is forked or bifurcated to provide a transversely extending slot, the longitudinal axis of which is coincident with the longitudinal axes of the stem 11 and the stem 16. The disk 14 is provided near its outer marginal portion with diametrically opposed concavities or seats 17 into which balls 18 are fitted, and the casing 10 is provided with a removable cap 19 which is preferably screw-threaded over the casing 10, and which engages at its inner face against the balls 18 to retain the disk 14 against the central ball 13. The cap 19 is provided with a central aperture through which the stem 16 freely engages, and the balls 13 and 18 reduce frictional contact between the disk 14 and the interior of the casing. The cap 19 is adapted to be turned up upon the casing 10 sufficiently to bind the balls 13 and 18 in their seat and thus hold the disk 14 from vibration. A centering pin 20 is provided with an outwardly tapering end adapted to engage the work at the central axis of the bore to be made, and is provided upon its opposite end with a flat shank 21 fitting between the fork arms of the stem 16, and being pivoted thereto by a transversely extending pin 22 engaging through the inner ends of the fork arms 16. The shank 21 is free to swing upon the pin 22 between the fork arms 16.

The shank 21 is provided at one side, and beyond the ends of the fork arms 16, with a laterally extending pivot pin 23 upon which is rotatably mounted a pinion 24, the latter meshing with a tooted segment 25 formed upon the end of the adjacent fork arm 16. The pinion 24 is provided with a preferably integral pointer arm or indicator 26 which, when the shank 21 is in longitudinal alinement with the fork arms 16, is also in longitudinal alinement therewith. The pointer arm 26 is provided upon its extremity with an overturned pointer 27 adapted to traverse an arcuate scale 28 formed upon the inner end and at one side of the shell or housing 29.

The shell or housing 29 comprises a pair of complemental hollow sections arranged against the opposite sides of the stem 16, and which are clamped together at their inner ends by machine screws 30, or the like, which traverse the upper and lower edges of the stem 16. The shell or housing 29 is held from swinging upon the stem 16 by the provision of a machine screw 31 which engages through one side of the housing 29 and into the adjacent fork arm 16.

The disk 14 is held from rocking in the casing 10 by the provision of bearing cups 32 which are fitted in recesses formed in the outer face of the disk 14 at diametrically opposed points, and at substantially right angles to the seats 17. The cups 32 are provided therein with springs 33 which engage at opposite ends against the disk 14 and the inner sides of the cups 32 to urge the latter outwardly against the cap 19. The stems 16 and the disk 14 are therefore permitted to rock to a slight extent in the application and operation of the device.

The inner end of the stem 16 has an annular threaded portion 34 upon which is adjustably mounted a milled annulus 35 adapted to be turned against the cap 19 to rigidly hold the stem 16 in axial alinement with the shank 11. This annulus 35 is particularly adapted for use in adjusting a plain surface into parallelism with the table of a vertical build. A spherical head 36 in the form of a ball, is suitably bored and is adapted to be fitted over the outer end of the centering pin 20 as shown in Fig. 6 and is held thereon by a set screw 37 or the like. The head 36 is adapted for contact with the plane surface.

In using the device, the shank 11 is inserted into the chuck A of the machine and the work D is adjusted approximately to the axis of the chuck. The centering pin 20 is now placed against the marked point on the work at which the latter is to be bored or operated upon, and the shell 29 is turned with the disk 14 into a vertical position, to the position shown in Fig. 1. If the work D is too high or too low, the centering pin 20 will be swung about its pivotal support 22 and will rotate the pinion 24 and swing the arm 26. The increased leverage resulting from the length of the fork arms 16, and the length of the pointer arm 26, indicates at a relatively high ratio upon the scale 28 the deflections of the centering pin 20 from the intermediate zero point of the scale 28. The scale 28 may be graduated in any suitable manner, but preferably the graduations extend in rows from the opposite sides of a central zero point. The table B may now be vertically adjusted to obtain the required elevation of the work D for disposing the portion thereof to be bored in true axial alinement with the chuck A.

The shell or housing 29 is now turned into a position at right angles to that shown in Fig. 1 to dispose the scale 28 horizontally. Should the work D require horizontal adjustment, the centering pin 20 will now be deflected in either direction horizontally, with the resultant increased movement of the pointer arm 26, and the corresponding indication on the scale 28. The table B may now be adjusted horizontally to correct the inaccuracy and bring the desired point of work D into true axial alinement with the chuck A.

The chuck A or the work D may be moved axially and longitudinally of the machine to advance and retract the centering pin 20 from the point of work. The instrument may now be removed, and the boring or other tool desired may be inserted in the chuck A.

On account of the double increasing leverage obtained by the relative positioning of the pivot pins 20 and 23, it is found that indications of one-half of one-thousandth of an inch may be clearly read upon the scale 28.

It is of course understood that various changes in construction and design of the above-specifically described indicator may be made without departing from the spirit of this invention, and being restricted only by the scope of the following claims.

I claim:—

1. In an indicator, the combination of a support, a stem mounted on the support to turn and rock thereon, a centering pin pivoted at its inner end to said stem, an indicator arm pivoted to said centering pin, and actuating means between said stem and said indicator arm.

2. In an indicator, the combination of a support, a stem rotatably mounted on the support and adapted to rock thereon, a centering pin provided with a shank pivoted at one end to the inner end of said stem, a pointer arm pivotally mounted on said shank in spaced relation to the pivoted end thereof, a pinion rotatably mounted on said shank and having connection with the pointer arm to turn the same, and a segmental rack on said stem engaging the pinion to actuate the pointer arm upon the swinging movement of said centering pin.

3. In an indicator, the combination of a support, a disk rotatably mounted on the support and adapted to rock thereon, said disk being provided with an outwardly extending stem, a centering pin pivoted to said stem, a pinion pivoted to said centering pin in spaced relation from the said pivoted portion thereof, an indicator arm connected to the pinion and adapted to be rotated thereby, and a shell inclosing said stem and said pinion and provided with a scale adapted to be traversed by said indicator arm.

4. In an indicator, the combination of a support, a disk rotatably mounted in the support and adapted to rock therein, said disk having an outwardly extending forked stem, a centering pin provided with a shank at its inner end adapted to fit between the fork arms of said stem, means for pivotally connecting the free end of the shank at the inner ends of said fork arms, a pinion rotatably mounted on one side of said shank, a pointer arm carried by the pinion, and a shell surrounding the fork arms and the shank and provided with an oppositely extending scale adapted to be traversed by said indicator arm.

5. In a center indicator, the combination of a casing having a shank adapted to be secured in the chuck of a milling machine, a disk mounted to turn in the casing and having a centrally disposed stem projecting from the casing, yieldable means between the casing and the disk for yieldingly retaining the latter in position with the stem thereof in axial alinement with the shank and the chuck, a centering pin connected to the stem, and means for indicating the deflection of the centering pin from the longitudinal axis of the shank and the chuck.

6. In a center indicator, the combination of a casing having a shank adapted to be secured in the chuck of a milling machine, a disk connected to the casing and adapted to turn with respect thereto and provided with a centrally disposed stem projecting from the casing, yieldable means between the casing and the disk for yieldingly retaining the latter in position with the stem thereof in axial alinement with the shank and the chuck, a centering pin pivotally mounted upon the stem, and means connected to the stem and the centering pin for indicating the deflection of the centering pin from the longitudinal axis of the stem.

7. In a center indicator, the combination of a casing having a shank adapted to be secured in the chuck of a milling machine, a disk mounted to turn in the casing and having a centrally disposed stem projecting from the casing, a centering pin pivotally mounted upon the inner end of the stem, a pointer arm rotatably mounted upon the centering pin beyond the free end of the stem, a connection between the free end of the stem and said pointer arm, and a shell secured to the stem and inclosing the same and the pointer arm and provided with a scale having graduations extending in opposite directions on the inner end of the scale, said pointer arm being provided with a pointer extremity projecting through the shell and arranged to traverse said scale.

JOSEPH H. BOISVERT.

Copies of this patent may be obtained for five cents each, by addressing the "Commissioner of Patents, Washington, D. C."